United States Patent
Mori

(10) Patent No.: US 12,470,675 B2
(45) Date of Patent: Nov. 11, 2025

(54) PROJECTION METHOD AND PROJECTOR

(71) Applicant: SEIKO EPSON CORPORATION, Tokyo (JP)

(72) Inventor: Yuki Mori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 383 days.

(21) Appl. No.: 18/087,886

(22) Filed: Dec. 23, 2022

(65) Prior Publication Data

US 2023/0209026 A1 Jun. 29, 2023

(30) Foreign Application Priority Data

Dec. 27, 2021 (JP) .................................. 2021-212429

(51) Int. Cl.
*H04N 9/31* (2006.01)

(52) U.S. Cl.
CPC .................................. *H04N 9/3179* (2013.01)

(58) Field of Classification Search
CPC .. H04N 9/3147; H04N 9/3179; H04N 9/3185; H04N 9/3188; H04N 9/3194; H04N 21/47; H04N 21/4121; H04N 21/4122; H04N 21/42204; H04N 21/4854
See application file for complete search history.

(56) References Cited

U.S. PATENT DOCUMENTS

| | | | |
|---|---|---|---|
| 2007/0110304 A1* | 5/2007 | Tsukada | H04N 1/6033 382/167 |
| 2009/0015730 A1* | 1/2009 | Arakawa | H04N 9/3185 348/744 |
| 2011/0069234 A1* | 3/2011 | Kaise | H04N 21/47 348/E5.077 |
| 2020/0228767 A1* | 7/2020 | Ichieda | H04N 9/3194 |
| 2021/0035316 A1* | 2/2021 | Shishido | H04N 9/3185 |
| 2021/0306604 A1* | 9/2021 | Kubota | G03B 21/26 |

FOREIGN PATENT DOCUMENTS

| | | |
|---|---|---|
| JP | 2004-304472 A | 10/2004 |
| JP | 2011-248185 A | 12/2011 |

* cited by examiner

*Primary Examiner* — Sultan Chowdhury
(74) *Attorney, Agent, or Firm* — Oliff PLC

(57) ABSTRACT

A controller of a projector accepts operation of changing the position of a vertex of a first pattern image projected on a projection surface, deforms the shape of a second pattern image containing a plurality of dots based on the operation, causes the second pattern image to be projected onto the projection surface, generates second correction data for correction of the second image based on a captured image as a result of capture of an image of the projection surface on which the second pattern image has been projected in such a way that the positions of the plurality of dots are corrected, and causes an image corrected by using the generated correction data to be projected onto the projection surface.

7 Claims, 15 Drawing Sheets

PROJECTION METHOD AND PROJECTOR

The present application is based on, and claims priority from JP Application Serial Number 2021-212429, filed Dec. 27, 2021, the disclosure of which is hereby incorporated by reference herein in its entirety.

BACKGROUND

1. Technical Field

The present disclosure relates to a projection method and a projector.

2. Related Art

There has been a known technology for correcting distortion of an image displayed on a projection surface.

For example, JP-A-2011-248185 discloses a projection-type video display apparatus that generates a corrected image signal representing correction of distortion of an image projected on a projection surface in accordance with changes in correction points at the four corners identified on the projected image, and similarly deforms the distortion of the image based on the generated corrected image signal.

There is, however, a desire to accurately correct image distortion even on projection surfaces having more complex shapes.

SUMMARY

A projection method according to an aspect of the present disclosure includes projecting a first image onto a projection surface, accepting operation of changing a position of a vertex of the first image, deforming a shape of a second image containing a plurality of first figures based on the operation, projecting the second image onto the projection surface, acquiring a captured image as a result of capture of an image of the projection surface on which the second image is projected, generating correction data for correction of the second image based on the captured image in such a way that positions of the plurality of first figures are corrected, and projecting an image corrected by using the correction data onto the projection surface.

A projector according to another aspect of the present disclosure includes a projection unit that projects an image onto a projection surface, an acceptance section that accepts operation, and a controller that when accepting operation of changing a position of a vertex of a first image projected on the projection surface from the acceptance unit, deforms a shape of a second image containing a plurality of first figures based on the operation, causes the second image to be projected via the projection unit onto the projection surface, acquires a captured image as a result of capture of an image of the projection surface on which the second image is projected, generates correction data for correction of the second image based on the captured image in such a way that positions of the plurality of first figures are corrected, and causes an image corrected by using the correction data to be projected via the projection unit onto the projection surface.

DESCRIPTION OF EXEMPLARY EMBODIMENTS

1. Configuration of Projector

Figure 1:
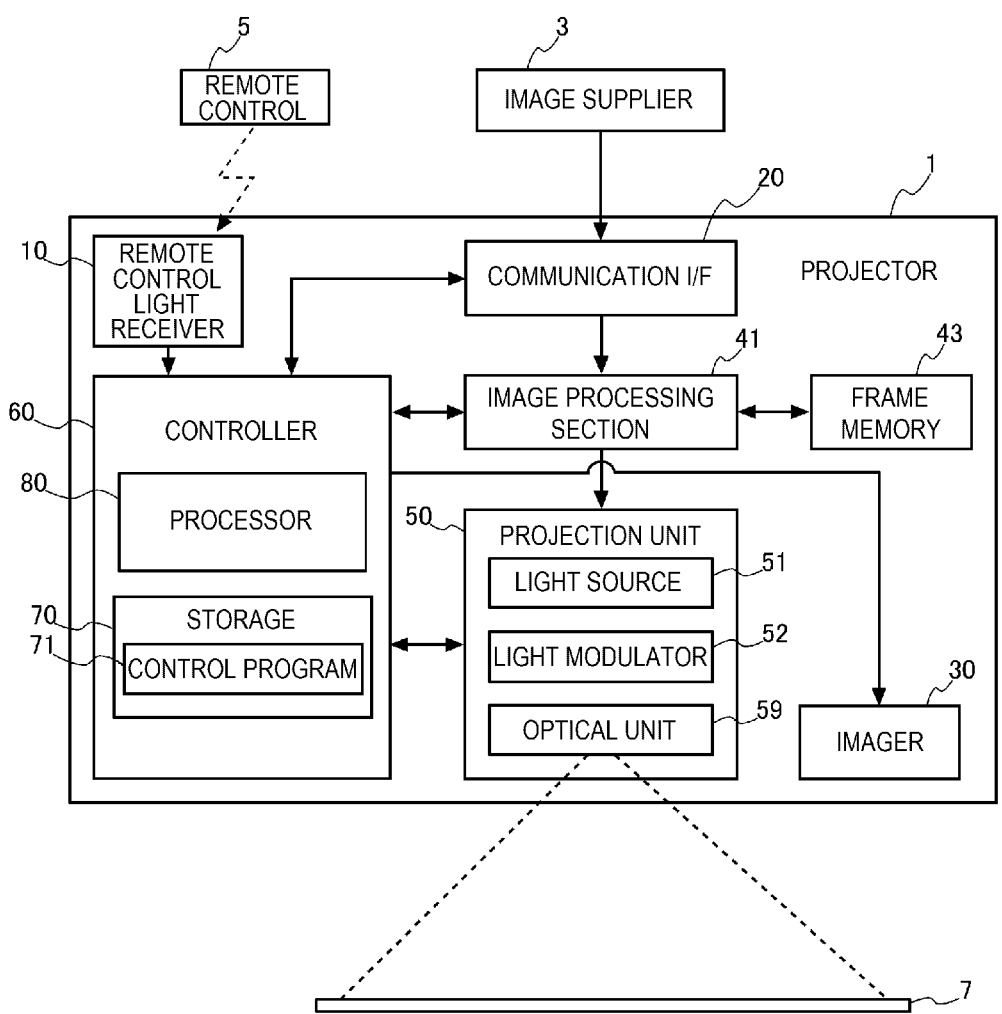
FIG. 1 is a block diagram showing the configuration of a projector.

FIG. 1 is a block diagram showing the configuration of a projector 1.

The projector 1 is an apparatus that generates image light based on image data supplied from an image supplier 3 or image data stored in a storage 70 provided in the projector 1, enlarges the generated image light, and projects the enlarged image light onto a projection surface 7. The projection surface 7 may, for example, be a screen, a wall of a room, or a whiteboard. The image data supplied from the image supplier 3 and the image data stored in the storage 70 of the projector 1 are hereinafter referred to as display image data.

The projector 1 includes a remote control light receiver 10, a communication interface 20, an imager 30, an image processing section 41, a frame memory 43, a projection unit 50, and a controller 60. An interface is hereinafter abbreviated to an I/F.

A remote control 5 and a remote control light receiver 10 correspond to an acceptance section. The remote control light receiver 10 receives an infrared signal transmitted from the remote control 5. The remote control light receiver 10 decodes the received infrared signal to generate an operation signal corresponding to the infrared signal. The thus generated operation signal is a signal corresponding to a button provided as part of the remote control 5 and operated by a user. The remote control light receiver 10 outputs the generated operation signal to the controller 60.

A communication I/F 20 is a communication device and is wired to the image supplier 3. The present embodiment will be described with reference to the case where the projector 1 and the image supplier 3 are wired to each other, and the projector 1 and the image supplier 3 may be wirelessly connected to each other. The communication I/F 20 outputs the display image data received from the image supplier 3 to the image processing section 41.

The imager 30 includes an imaging optical system including an imaging lens, an imaging device, such as a CCD (charge-coupled device) and a CMOS (complementary MOS) device, and a data processing circuit. The imager 30 is, for example, a camera. The imaging optical system, the imaging device, and the data processing circuit are not shown. The angle of view of the imager 30 covers the entire projection surface 7. The imager 30 captures an image of the projection surface 7 to generate a captured image. The imager 30 outputs the generated captured image to the controller 60. The controller 60 causes the storage 70 to temporarily store the inputted captured image.

The frame memory 43 is coupled to the image processing section 41. The image processing section 41 develops the display image data inputted from the communication I/F 20 in the frame memory 43 on a frame basis. The frame memory 43 includes a plurality of banks. The banks each have storage capacity that allows display image data corresponding to one frame to be developed in the bank. The frame memory 43 is formed, for example, of an SDRAM (synchronous dynamic random access memory).

The image processing section 41 performs image processing on the display image data developed in the frame memory 43, for example, resolution conversion or resizing, distortion correction, shape correction, digital zooming, and image color tone and brightness adjustment. The image processing section 41 performs image processing specified by the controller 60 and uses, as required, parameters inputted from the controller 60 to perform the image processing. The image processing section 41 can, of course, perform a plurality of types of the image processing described above in combination. The image processing section 41 reads the display image data having undergone the image processing from the frame memory 43 and outputs the read data to a light modulator 52.

The image processing section 41 and the frame memory 43 are each formed, for example, of an integrated circuit. The integrated circuit includes an LSI, an ASIC (application specific integrated circuit), a PLD (programmable logic device), an FPGA (field-programmable gate array), an SoC (system-on-a-chip), and other devices. An analog circuit may form part of the configuration of each of the integrated circuits, or the controller 60 and the integrated circuits may be combined with each other.

Figure 2:
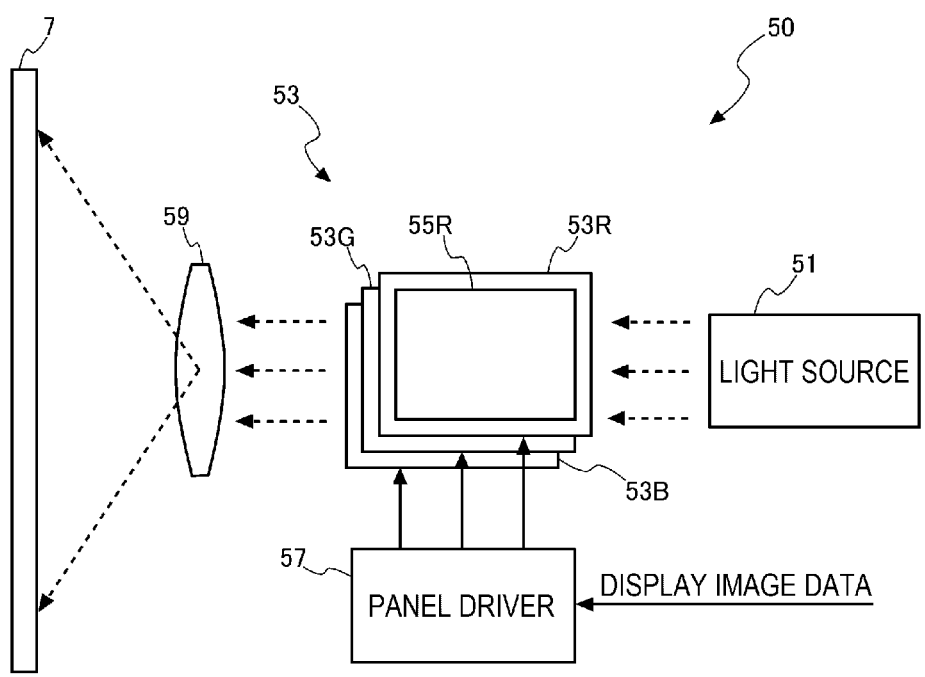
FIG. 2 shows the configuration of a projection unit.

FIG. 2 shows the configuration of the projection unit 50.

The configuration of the projection unit 50 will be described with reference to FIG. 2.

The projection unit 50 includes a light source 51, the light modulator 52, and an optical unit 59. The light modulator 52 in the present embodiment includes three transmissive liquid crystal panels 53R, 53G, and 53B corresponding to three colors, red, green and blue, as light modulation devices, and a panel driver 57, which drives the liquid crystal panels 53R, 53G, and 53B. The panel driver 57 is, for example, a drive circuit. Note that R is an abbreviation for red, G is an abbreviation for green, and B is an abbreviation for blue. The liquid crystal panels 53R, 53G, and 53B provided in the projector 1, when collectively referred to, are hereinafter called liquid crystal panels 53. The light modulation devices provided in the light modulator 52 in the present embodiment are not limited to the transmissive liquid crystal panels 53R, 53G, and 53B and may instead, for example, be reflective liquid crystal panels or digital micromirror devices (DMDs).

The light source 51 includes a discharge-type light source lamp, such as an ultrahigh-pressure mercury lamp and a metal halide lamp, or a solid-state light source, such as a light emitting diode and a semiconductor laser. The light outputted from the light source 51 enters the liquid crystal panels 53. The liquid crystal panels 53R, 53G, and 53B are each formed, for example, of a transmissive liquid crystal panel including a liquid crystal material encapsulated between a pair of transparent substrates. The liquid crystal panel 53R modulates red light, the liquid crystal panel 53G modulates green light, and the liquid crystal panel 53B modulates blue light. The liquid crystal panels 53 each have a panel area 55 formed of a plurality of pixels arranged in a matrix. The panel area 55 formed in the liquid crystal panel 53R is denoted as a panel area 55R, and the panel area 55 formed in the liquid crystal panel 53G is denoted as a panel area 55G, and the panel area 55 formed in the liquid crystal panel 53B is denoted as a panel area 55B. The panel areas 55 correspond to image drawn areas of the light modulator 52.

The display image data outputted by the image processing section 41 is inputted to the panel driver 57. The panel driver 57 applies a drive voltage according to inputted display image data to each of the pixels in the panel areas 55 to set the pixel to have light transmittance according to the display image data. The light outputted from the light source 51 passes through the panel areas 55 of the liquid crystal panels 53, which modulate the light into red, green, and blue image light corresponding to the display image data. The thus formed red image light, green image light, and blue image light are combined with one another by a light combining system that is not shown into image light representing a color image. The optical unit 59 includes a projection lens and other components, enlarges the image light as a result of the modulation performed by the liquid crystal panels 53, and projects the enlarged image light onto the projection surface 7.

The controller 60 is a computer apparatus including the storage 70 and a processor 80.

The storage 70 includes a volatile memory, such as a RAM (random access memory), and a nonvolatile memory, such as a ROM (read only memory). The RAM is used to temporarily store a variety of data and other pieces of information, and the ROM stores a control program 71 and a variety of types of setting information used to control the action of the projector 1. The setting information contains, for example, information on the number of dots set by the user through operation of the remote control 5, and information on the panel resolution of the panel areas 55. The information on the number of dots and the information on the panel resolution will be described later.

The processor 80 is an arithmetic operation device formed of a CPU (central processing unit) or an MPU (microprocessing unit). The processor 80 executes the control program 71 to control each portion of the projector 1.

The controller 60 causes the image processing section 41 to process the display image data received by the communication I/F 20. In this process, the controller 60 instructs the image processing section 41 on the type of image processing to be performed by the image processing section 41 and outputs parameters used by the image processing section 41 to perform the image processing to the image processing section 41. Furthermore, the controller 60 controls the light source 51 and the panel driver 57 of the projection unit 50 to cause the projection unit 50 to generate the image light based on the display image data processed by the image processing section 41 and project the generated image light onto the projection surface 7.

Figure 3:
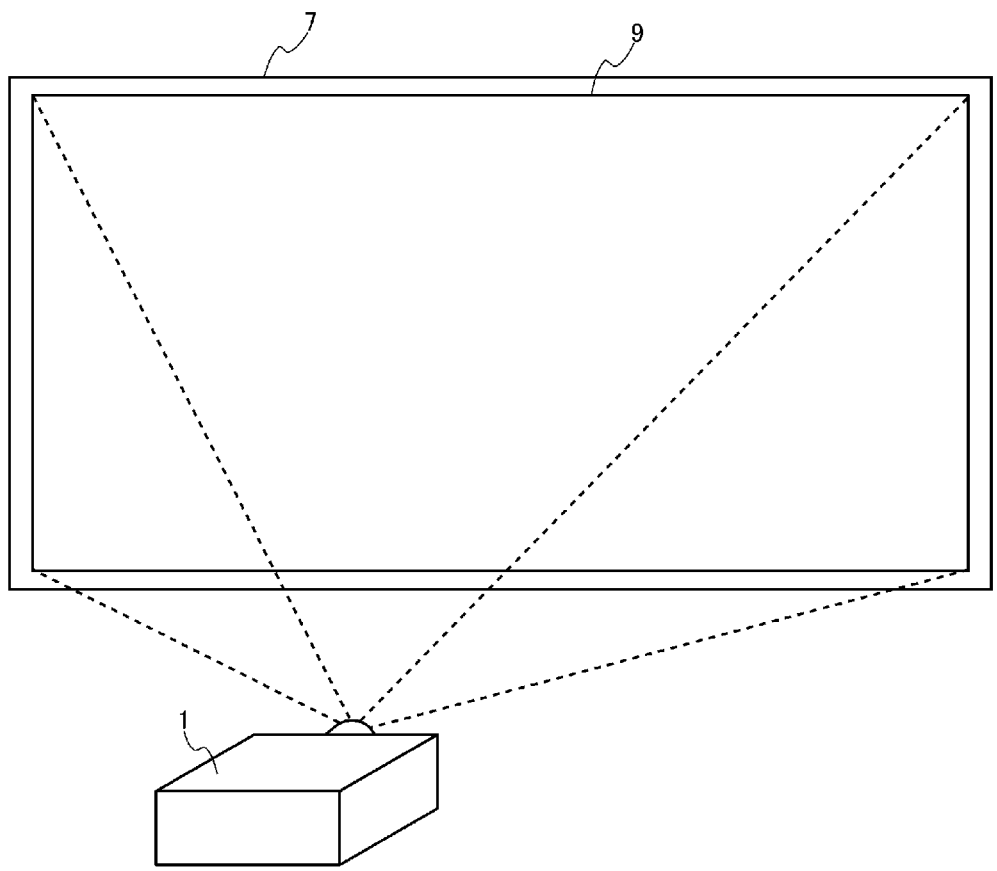
FIG. 3 shows a projection area of a projection surface.

FIG. 3 shows a projection area 9 of the projection surface 7.

When the projector 1 projects the image light onto the projection surface 7, a display image based on the display image data is displayed on the projection surface 7. The projection area 9 is the area, of the projection surface 7, where the image light is projected. FIG. 3 shows the projection area 9 with the display image data drawn across the entire surface of the panel areas 55 of the liquid crystal panels 53.

When the controller 60 receives an operation signal instructing start of distortion correction from the remote control light receiver 10, the controller 60 starts quick corner correction and point correction.

The quick corner correction is the process of adjusting the positions of the four vertices of the image displayed on the projection surface 7 to correct the shape of the displayed image to a rectangular shape.

The point correction is the process of correcting distortion of the displayed image caused by distortion such as warpage and unevenness of the projection surface 7.

The controller 60 first determines a radius r of each dot, which is a figure used in the point correction. In the point correction, a pattern image having a plurality of dots arranged in a matrix is displayed on the projection surface 7 before the point correction is performed. Also in the quick corner correction, a pattern image is displayed on the projection surface 7 before the quick corner correction is performed. In the following description, the pattern image used in the quick corner correction is referred to as a first pattern image 200, and the pattern image used in the point correction is referred to as a second pattern image 300. The first pattern image 200 corresponds to a first image, and the second pattern image 300 corresponds to a second image.

In the point correction, the second pattern image 300 having a plurality of dots arranged in a matrix is displayed on the projection surface 7, and the imager 30 captures an image of the displayed second pattern image 300. The dots are detected from the captured image generated by the image capturing operation, and correction data for correction of the position of the displayed image is generated based on the positions of the detected dots in the captured image, so that the dots preferably each have a large radius r.

The controller 60 first reads the information on the number of dots set by the user through operation of the remote control 5, and the information on the panel resolution of the panel areas 55 from the storage 70. The information on the number of dots may be set in advance by the user through operation of the remote control 5, and the information on the number of dots can be changed by the user through operation of the remote control 5 after the first pattern image 200 or the second pattern image 300 is displayed on the projection surface 7. In this case, the controller 60 carries out the processes described above again starting from the calculation of the radius r of the dots.

The controller 60 calculates the radius r of the dots used in the second pattern image 300 based on the read information on the number of dots and panel resolution. The radius r is expressed in pixel.

It is assumed that the panel areas 55 are each, for example, a horizontally elongated area having, for example, a vertical dimension corresponding to 1080 pixels and a horizontal dimension corresponding to 1920 pixels. It is also assumed that S represents the resolution in the vertical direction, which is the direction of the short sides. It is still further assumed that the information on the number of dots set by the user shows that the number of dots in the vertical direction is N, and the number of dots in the horizontal direction is M. N and M are each any natural number.

Figure 4:
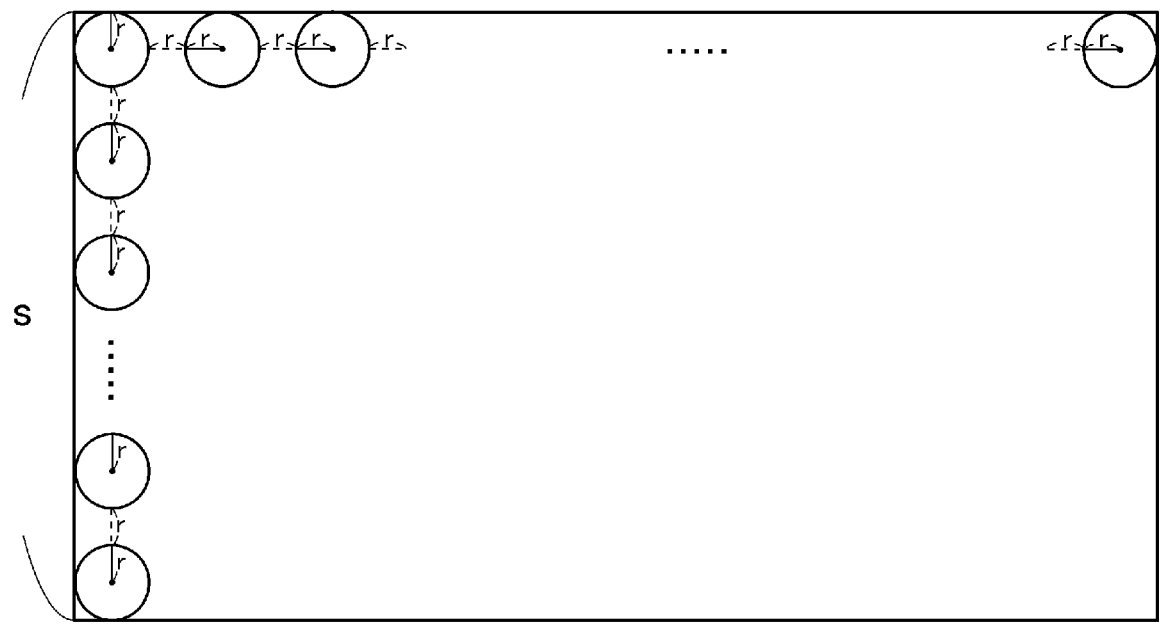
FIG. 4 describes how to calculate the radius of each dot.

FIG. 4 describes how to calculate the radius r of the dots.

FIG. 4 shows that the dots having the radius r are arranged. It is assumed that the interval between adjacent ones of the thus arranged dots is equal to the radius r of the dots. Since the vertical resolution S is equal to the sum of N dots having the diameter 2r and the N−1 intervals r, Expression (1) below is satisfied.

$$S = 2rN + r(N-1) \quad (1)$$

The radius r is therefore determined by Expression (2) below.

$$r = S/(3N-1) \quad (2)$$

Figure 5:
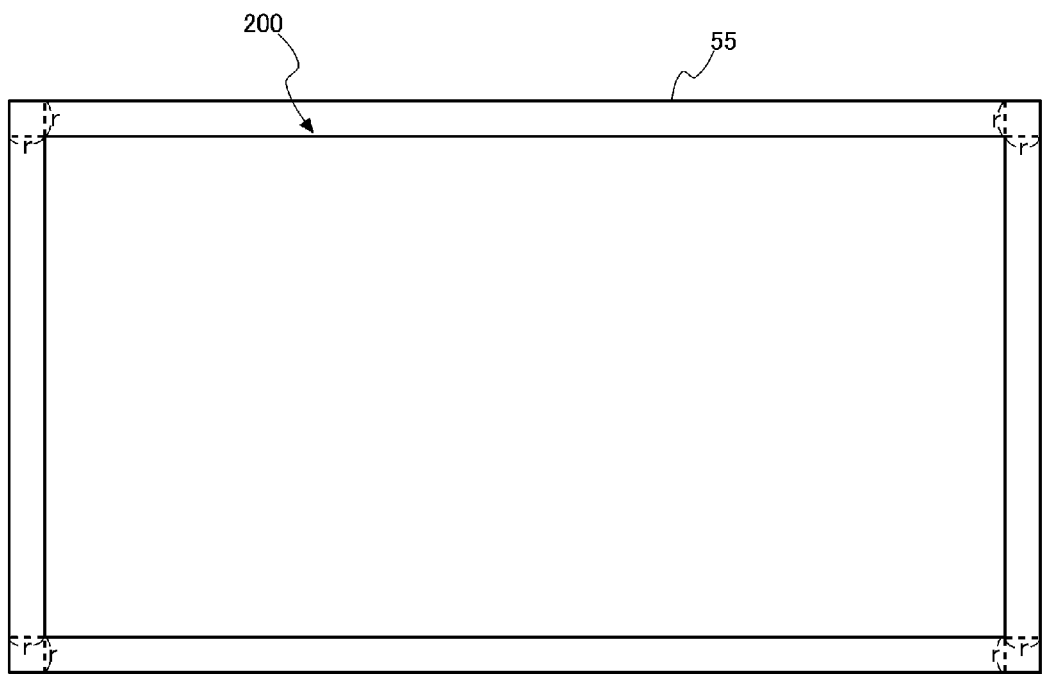
FIG. 5 shows the range of a panel area where a first pattern image can be drawn.

FIG. 5 shows the range, of the panel area 55 of each of the liquid crystal panels 53, where the first pattern image 200 can be drawn.

Upon the calculation of the radius r of the dots, the controller 60 generates the first pattern image 200 and causes the projection unit 50 to display the generated first pattern image 200 on the projection surface 7. The first pattern image 200 is drawn so as to be shifted inward by a certain distance from the upper, lower, right, and left ends of the panel area 55 of each of the liquid crystal panel 53. Specifically, the first pattern image 200 is formed so as to be shifted inward by the radius r from the upper and lower ends of the panel area 55. Similarly, the first pattern image 200 is formed so as to be shifted inward by the radius r from the right and left ends of the panel area 55.

Figure 6:
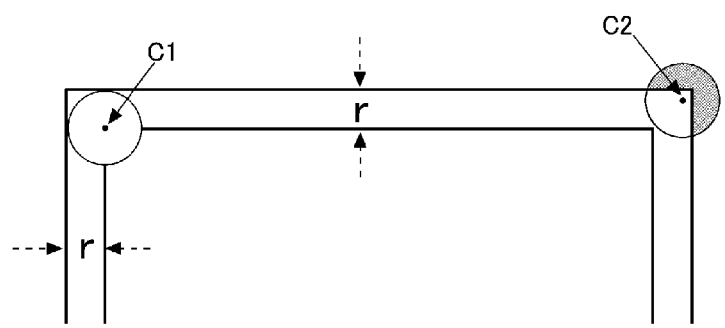
FIG. 6 describes the range of the panel area where the dots can be drawn.

FIG. 6 describes the range of the panel area 55 where the dots can be drawn.

A dot C1 shown in FIG. 6 is so drawn that the center of the dot C1 is located at a position shifted inward by the radius r from the upper end of the panel area 55. Similarly, the dot C1 is so located that the center of the dot C1 is located at a position shifted inward by the radius r from the left end of the panel area 55 in the plane of view. The entire dot C1 can therefore be drawn within the panel area 55 of the liquid crystal panel 53, and when the dot C1 is displayed on the projection surface 7, the entire dot C1 is displayed thereon.

In contrast, a dot C2 shown in FIG. 6 is located at a position where the distance between the center of the dot C2 and the upper end of the panel area 55 is smaller than the radius r. Furthermore, the distance between the center of the dot C2 and the right end of the panel area 55 is smaller than the radius r in the plane of view. Part of the dot C2, the meshed portion in FIG. 6, is therefore not drawn in the panel area 55 or not displayed on the projection surface 7. Therefore, upon the calculation of the radius r of the dots, the controller 60 forms the first pattern image 200 at the position where the first pattern image 200 is shifted inward by the radius r from each of the upper, lower, right, and left ends of the panel area 55.

Figure 7:
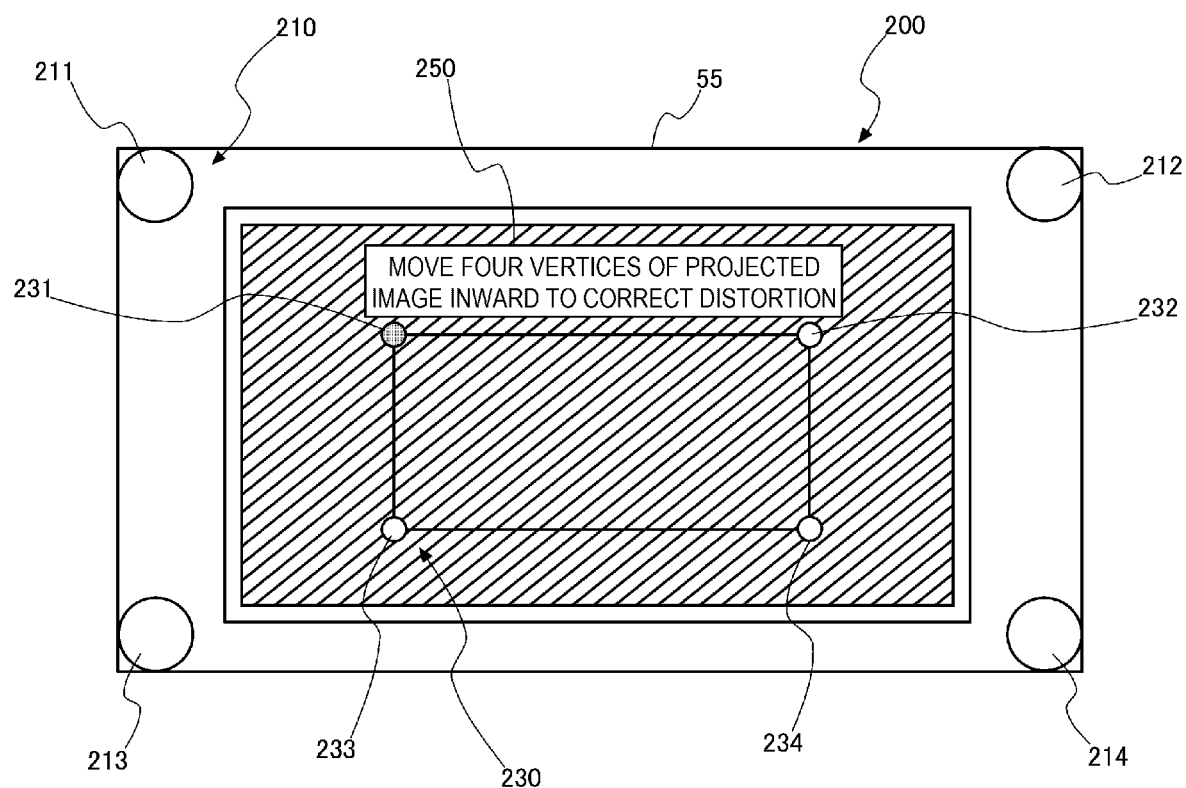
FIG. 7 shows the first pattern image.
Figure 8:
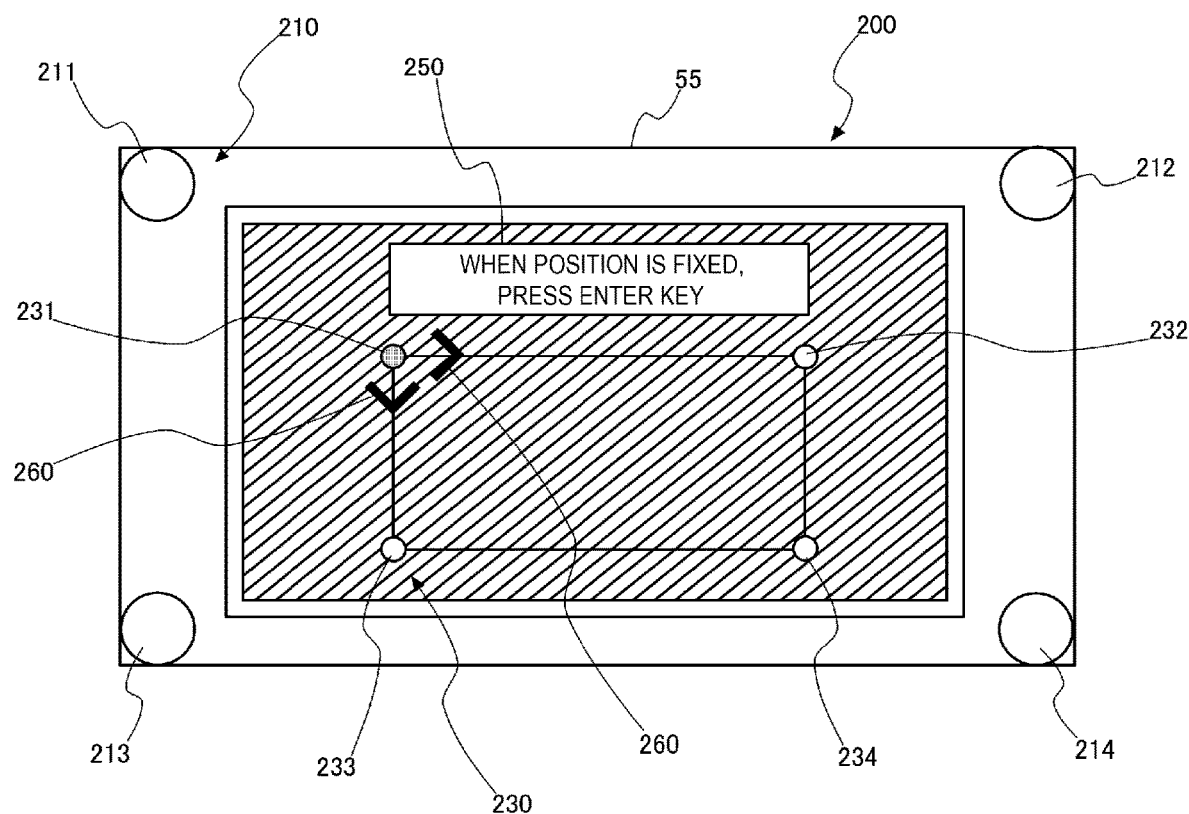
FIG. 8 shows the first pattern image.

FIGS. 7 and 8 show the first pattern image 200.

The first pattern image 200 shown in FIG. 7 contains vertex figures 210, operation figures 230, and a guide display 250. The guide display 250 is a display that informs the user of the operation to be performed via the remote control 5.

The vertex figures 210 correspond to a second figure. The vertex figures 210 are figures placed at the positions corresponding to the four vertices of the range of the projection area 9, where the dots can be displayed, and includes four vertex figures, a first vertex FIG. 211, a second vertex FIG. 212, a third vertex FIG. 213, and a fourth vertex FIG. 214.

The operation figures 230 are figures showing user-selected vertex figures 210, and include four operation figures, a first operation FIG. 231, a second operation FIG. 232, a third operation FIG. 233, and a fourth operation FIG. 234. The first operation FIG. 231 corresponds to the first vertex FIG. 211, the second operation FIG. 232 corresponds to the second vertex FIG. 212, the third operation FIG. 233 corresponds to the third vertex FIG. 213, and the fourth operation FIG. 234 corresponds to the fourth vertex FIG. 214.

The user operates the remote control 5 while viewing the first pattern image 200 displayed on the projection surface 7, and inputs a selected vertex FIG. 210 to be adjusted in terms of display position thereof, the direction in which the selected vertex FIG. 210 is moved, and the amount by which the selected vertex FIG. 210 is moved.

When the user operates the remote control 5 and selects a vertex to be adjusted in terms of position, the operation FIG. 230 corresponding to the selected vertex is displayed in an aspect different from the aspect in which the other operation figures 230 are displayed. FIG. 7 shows that the first vertex FIG. 211 has been selected and the first operation FIG. 231 corresponding to the first vertex FIG. 211 is displayed in an aspect different from the aspect in which the other operation figures 230 are displayed.

FIG. 8 shows the first pattern image 200 displayed after the vertex FIG. 210 to be adjusted in terms of display position is selected.

When the vertex FIG. 210 to be adjusted in terms of display position is selected, the controller 60 causes the projection unit 50 to display arrow images 260, which each indicates the direction in which the vertex figure is movable, at the operation FIG. 230 corresponding to the selected vertex FIG. 210.

FIG. 8 shows that the arrow images 260 indicating the rightward and downward directions in which the first vertex FIG. 211 is movable are displayed at the first operation FIG. 231.

Figure 9:
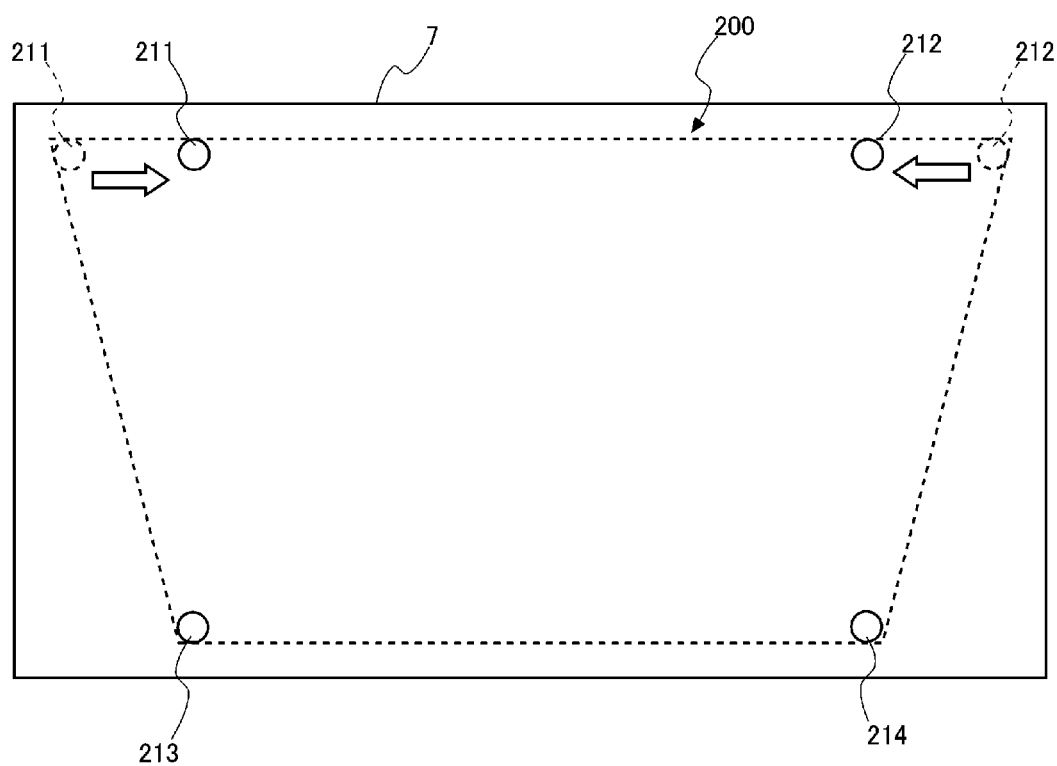
FIG. 9 shows the first pattern image displayed on the projection surface.

FIG. 9 shows the first pattern image 200 displayed on the projection surface 7.

It is assumed that a trapezoidally distorted figure shown in FIG. 9 is displayed by displaying a rectangular figure formed of straight lines that couple the centers of the four vertex figures 210 shown in FIG. 7 to each other on the projection surface 7. To simplify the description, the operation figures 230 and the guide display 250 are omitted in FIG. 9.

When the projector 1 does not squarely face the projection surface 7, but the projector 1 is installed with a tilt with respect to the projection surface 7, the shape of the rectangular figure is distorted. FIG. 9 shows a case where the distance between the vertically lower half of the projection surface 7 and the projector 1 is greater than the distance between the vertically upper half of the projection surface 7 and the projector 1 and the top side of the displayed figure is therefore longer than the bottom side thereof.

The user operates the remote control 5 while viewing the projection surface 7 in such a way that the figure formed of the straight lines that couple the centers of the four vertex figures 210 to each other forms a rectangular shape. In more detail, the user operates the remote control 5 to select any of the first vertex FIG. 211 to the fourth vertex FIG. 214, and inputs the direction in which the position of the selected vertex FIG. 210 is moved and the amount by which the selected figure is moved.

The controller 60 selects any one of the vertex figures 210 based on an operation signal inputted from the remote control light receiver 10, and moves the position of the selected vertex FIG. 210 in the movement direction indicated by the operation signal and by the amount of movement indicated by the operation signal. FIG. 9 shows the positions of the four vertex figures 210 before the movement and the positions of the four vertex figures 210 after the movement.

When the display position of a vertex FIG. 210 is changed, the controller 60 generates first correction data based on the amount and direction of the movement inputted via the remote control 5. That is, the controller 60 generates first correction data in accordance with which the position of a vertex FIG. 210 before deformation are moved to the position of the vertex FIG. 210 after deformation. The first correction data is generated whenever the user manipulates a vertex FIG. 210 to move the display position thereof.

Figure 10:
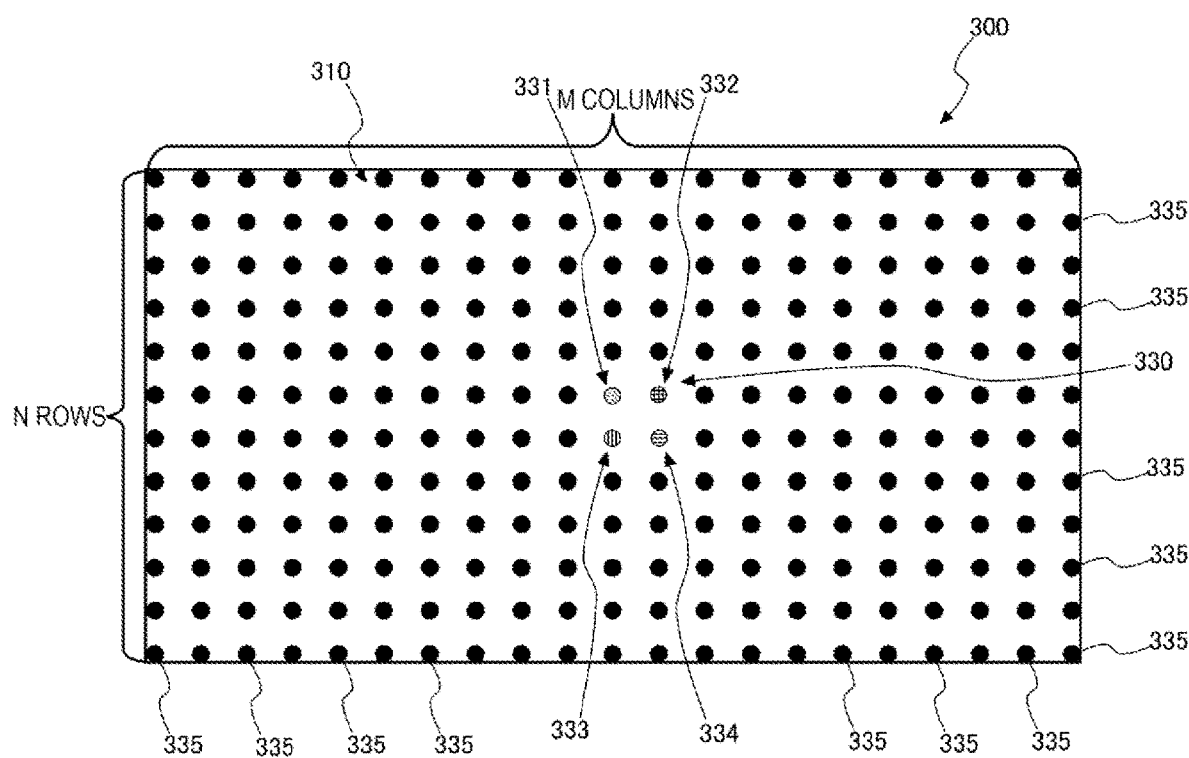
FIG. 10 shows a second pattern image.

FIG. 10 shows the second pattern image 300.

The second pattern image 300 will now be described. The second pattern image 300 has a dot pattern 310, in which a plurality of dots are arranged in a matrix. The radius of each of the dots is set at the calculated radius r. The second pattern image 300 shown in FIG. 10 has a dot pattern 310 having N vertically arranged rows and M horizontally arranged columns. N and M are each an integer greater than or equal to three.

At a substantial center of the dot pattern 310, four dots different from the other dots in terms of display aspect are arranged in a matrix formed of two rows and two columns. The four dots are used for position detection, and the positions of the other dots are identified based on the detected positions of the four dots.

Out of the four dots arranged in the two rows and two columns, the dot located at the upper left position in the plane of view is called a first dot 331, and the dot to the right of the first dot 331 and adjacent thereto in the plane of view is called a second dot 332. In addition, the dot below the first dot 331 and adjacent thereto in the plane of view is called a third dot 333. Furthermore, the dot below the second dot 332 and adjacent thereto in the plane of view is called a fourth dot 334. The first dot 331, the second dot 332, the third dot 333, and the fourth dot 334, when collectively referred to, are called detection dots 330.

In the dot pattern 310 formed in the second pattern image 300, the dots other than the detection dots 330 are referred to as black dots 335. The detection dots 330 and the black dots 335 correspond to a first figure.

In the present embodiment, the first dot 331 is drawn red, the second dot 332 is drawn blue, the third dot 333 is drawn green, and the fourth dot 334 is drawn white against a black background. The first dot 331, the second dot 332, the third dot 333, and the fourth dot 334 only need to be drawn in different colors other than black, which is the color of the black dots 335.

In the present embodiment, the first dot 331, the second dot 332, the third dot 333, the fourth dot 334, and the black dots 335 are drawn in different colors to form dots having different display aspects. The first dot 331, the second dot 332, the third dot 333, the fourth dot 334, and the black dots 335 may instead be formed in shapes different from one another.

Figure 11:
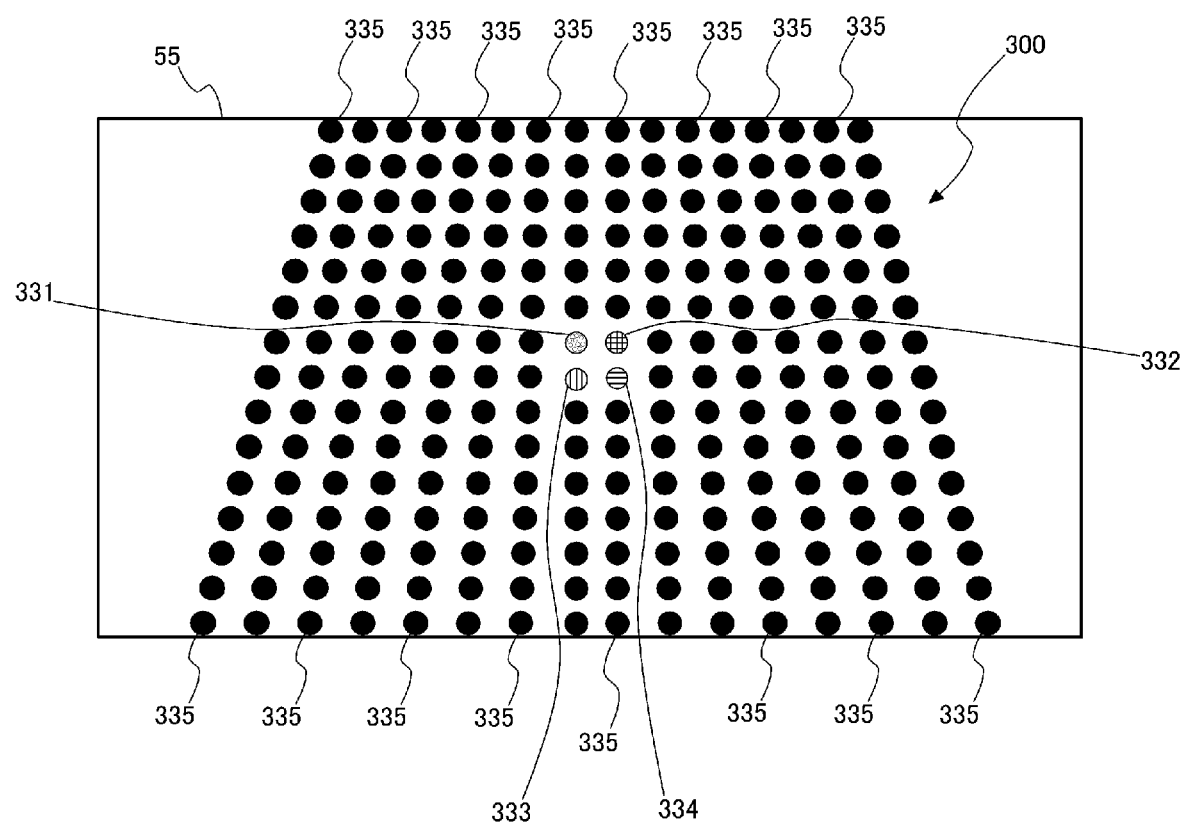
FIG. 11 shows a second pattern image after deformation.
Figure 12:
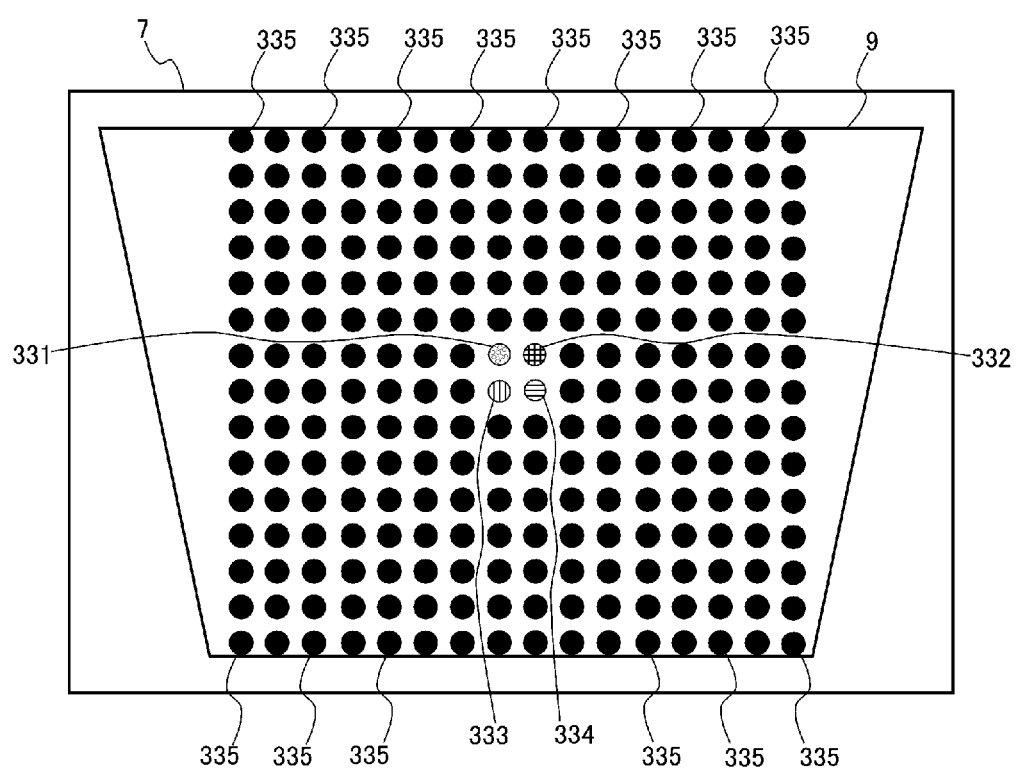
FIG. 12 shows the second pattern image displayed on the projection surface after deformation.

FIG. 11 shows the second pattern image 300 after deformation. FIG. 12 shows the second pattern image 300 displayed on the projection surface 7 after deformation.

Upon the generation of the first correction data, the controller 60 deforms the shape of the second pattern image 300 based on the generated first correction data. That is, the positions of the vertices of the second pattern image 300 are corrected by the corresponding first correction data. The second pattern image 300 is thus so corrected that the centers of gravity or the centers of the black dots 335 located at the vertices of the second pattern image 300 are located at the centers of gravity or the centers of the vertex FIG. 210 located at the corresponding vertices of the first pattern image 200. FIG. 11 shows the second pattern image 300 drawn in the panel area 55 after the deformation. The controller 60 outputs the deformed second pattern image 300 to the image processing section 41. The second pattern image 300 is then displayed by the projection unit 50 on the projection surface 7. FIG. 12 shows the second pattern image 300 displayed on the projection surface 7 after the deformation.

When the deformed second pattern image 300 is displayed on the projection surface 7, the controller 60 causes the imager 30 to capture an image of the projection surface 7. The imager 30 performs image capturing in accordance with the instruction from the controller 60 to generate a captured image. The imager 30 outputs the generated captured image to the controller 60.

The controller 60 generates second correction data for correction of the image distortion based on the inputted captured image. The controller 60 first performs image analysis on the captured image to detect the four detection dots 330. The controller 60 then calculates a determinant for projective transformation based on the detection dots 330 arranged in two rows and two columns. The determinant transforms the positions of the first dot 331, the second dot 332, the third dot 333, and the fourth dot 334 of the second pattern image 300 after the deformation into the positions of the first dot 331, the second dot 332, the third dot 333, and the fourth dot 334 of the captured image.

The controller 60 then uses the calculated determinant for projective transformation to perform a projective transformation of the position of each of the dots contained in the second pattern image 300 after the deformation, and identifies the dots in the captured image based on the positions of the dots having undergone the projective transformation. That is, the black dots 335 contained in the second pattern image 300 are associated with the black dots 335 contained in the captured image.

The controller 60 then generates the second correction data, in accordance with which the positions of the dots in the second pattern image 300 are corrected, based on each of the dots in the captured image. That is, the controller 60 generates the second correction data, in accordance with which the positions of the associated dots in the second pattern image 300 are corrected, based on the amount of displacement of the position of each of the dots in the captured image.

Upon the generation of the second correction data, the controller 60 outputs the generated first and second correction data to the image processing section 41. The image processing section 41 corrects the display image data inputted from the communication I/F 20 or the display image data read from the storage 70 based on the inputted first and second correction data, and outputs the corrected display image data to the projection unit 50. The projection unit 50 develops in the panel area 55 of each of the liquid crystal panels 53 a display image based on the display image data and corrected by using the first and second correction data. The light outputted from the light source 51 passes through the panel areas 55 to generate image light corresponding to the display image data. The generated image light is enlarged and projected onto the projection surface 7 by the optical unit 59.

Figure 13:
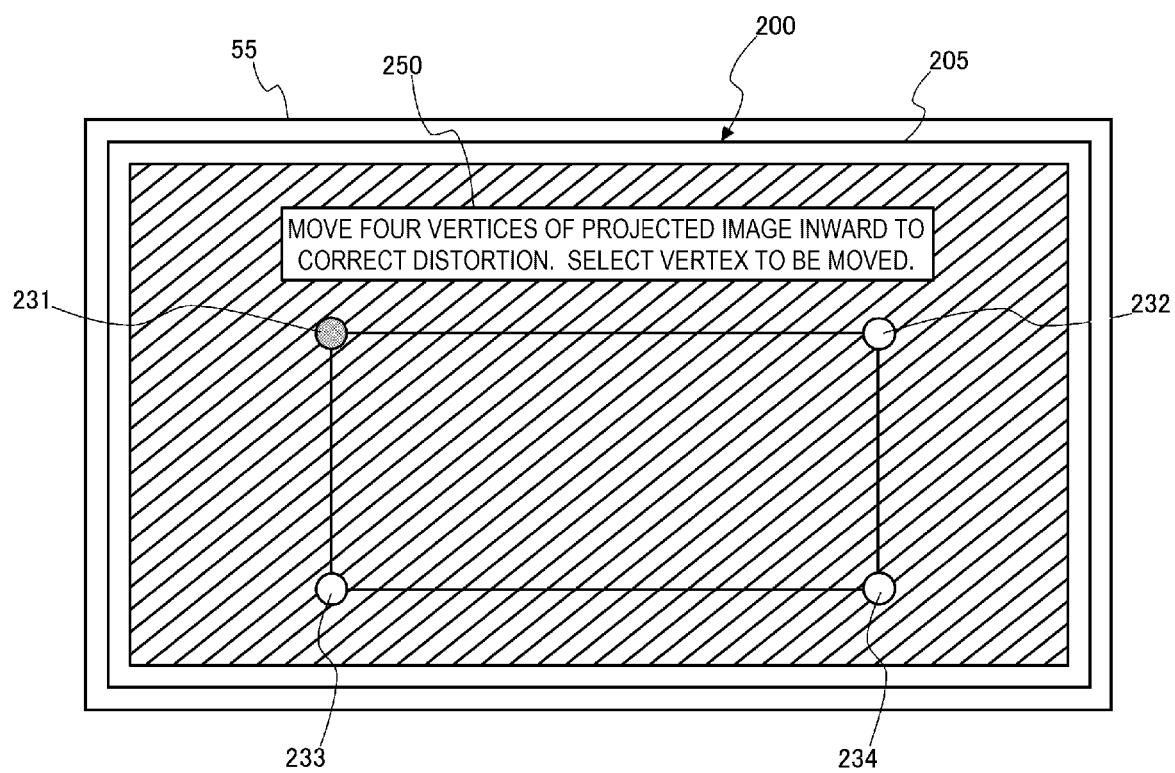
FIG. 13 shows a first variation of the first pattern image.

FIG. 13 shows a first variation of the first pattern image 200.

The first pattern image 200 shown in FIG. 7 shows the vertex figures 210 showing the four vertices of the range of the projection area 9, where dots can be displayed.

In the first variation of the first pattern image 200 shown in FIG. 13, the vertex figures 210 are not displayed, and the first pattern image 200 is drawn in each of the panel areas 55 so as to be displayed at a position sifted inward by the radius r from each of the upper, lower, right, and left sides of the panel area 55. That is, an outer frame 205, which forms the first pattern image 200, is used to indicate the range of the projection area 9, where dots can be displayed. The outer frame 205 corresponds to an image of a frame.

Figure 14:
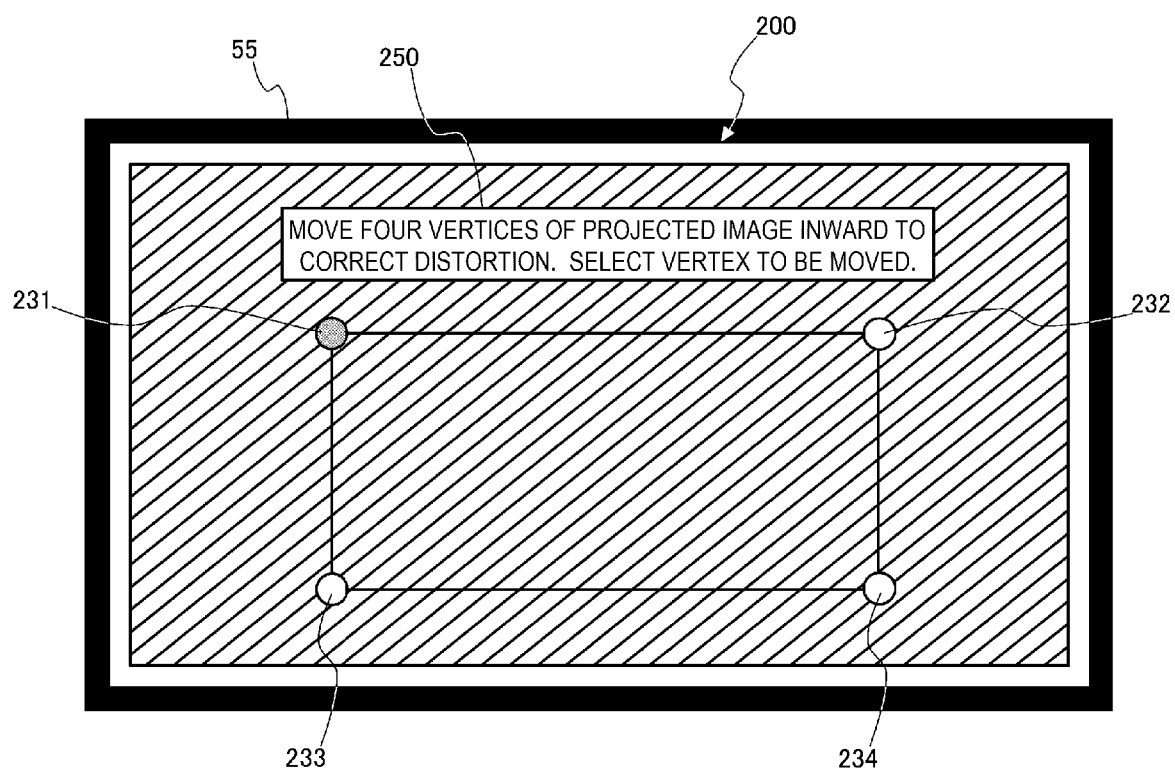
FIG. 14 shows a second variation of the first pattern image.

FIG. 14 shows a second variation of the first pattern image 200.

In the variation of the first pattern image 200 shown in FIG. 14, a black image is drawn in an area outside the range of the projection area 9, where dots can be displayed, in the panel area 55 of each of the liquid crystal panels 53. Drawing a black image in an area outside the range of the projection area 9, where dots can be displayed, allows the user to recognize the range of the projection area 9, where dots can be displayed, and the other area.

2. Action of Projector

Figure 15:
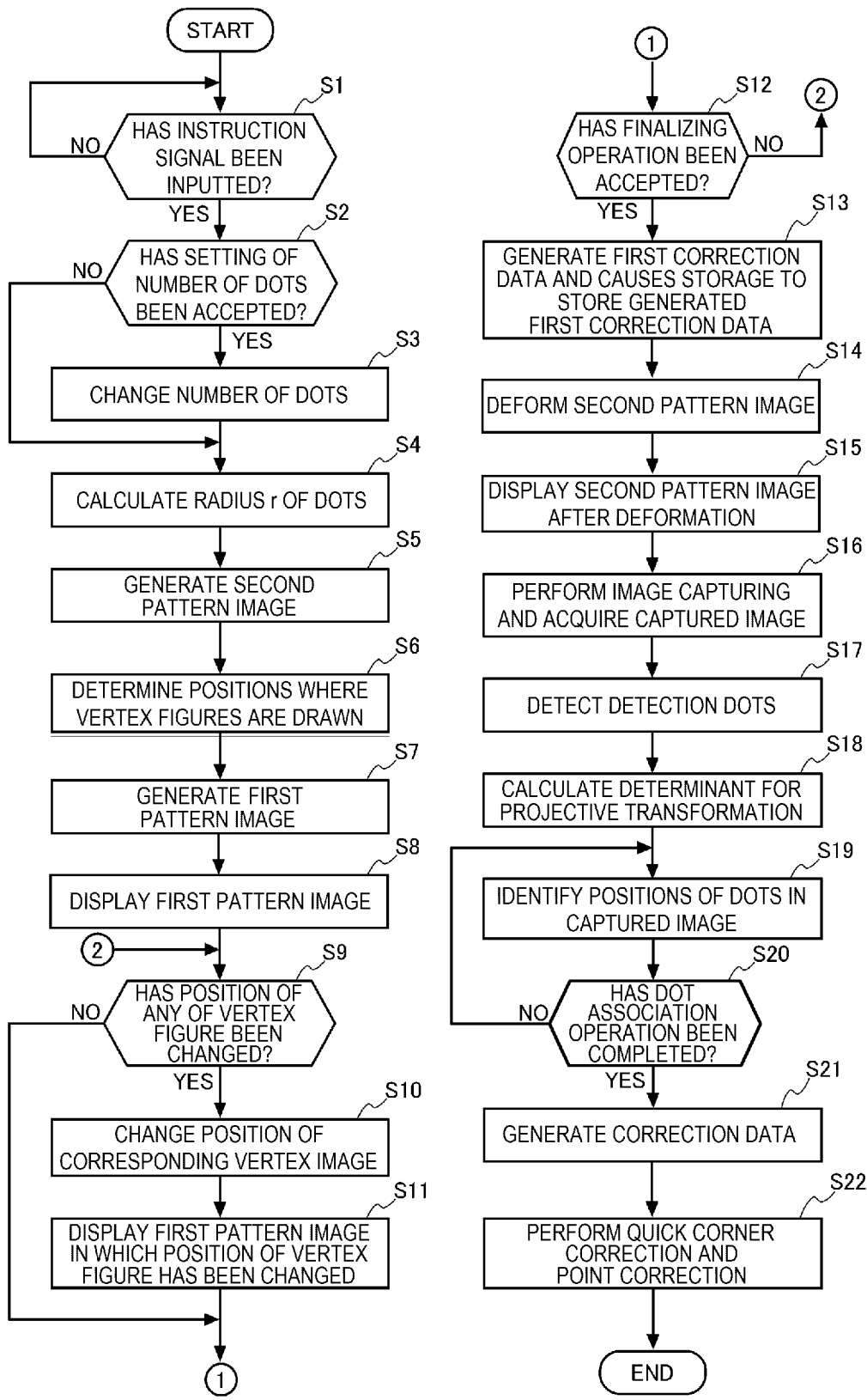
FIG. 15 is a flowchart showing the action of the projector.

FIG. 15 is a flowchart showing the action of the projector 1.

The action of the projector 1 will be described with reference to the flowchart shown in FIG. 15.

First, the controller 60 evaluates whether or not the operation signal indicating start of the distortion correction has been inputted from the remote control light receiver 10 (step S1). When the controller 60 determines that the operation signal has not been inputted (NO in step S1), the controller 60 returns to the evaluation in step S1.

When the controller 60 determines that the operation signal has been inputted (YES in step S1), the controller 60 evaluates whether or not an operation signal causing a change in the setting of the number of dots has been inputted (step S2). When the operation signal causing a change in the setting of the number of dots has been inputted (YES in step S2), the controller 60 changes the information on the number of dots stored in the storage 70 to the number of dots indicated by the operation signal (step S3).

When the operation signal causing a change in the setting of the number of dots has not been inputted (NO in step S2), or when the controller 60 changes the information on the number of dots stored in the storage 70 in step S3, the controller 60 calculates the radius r of the dots used in the point correction (step S4). The controller 60 reads the information on the number of dots and the information on the panel resolution of the panel areas 55 from the storage 70. The controller 60 uses Expression (2) described above to calculate the radius r of the dots used in the second pattern image 300 based on the read information on the number of dots and information on the panel resolution.

The controller 60 then generates the second pattern image 300 (step S5). The controller 60 generates the second pattern image 300 in which dots which each have the radius of the dots is the calculated radius r and the number of which has been set by the user are arranged in a matrix.

The controller 60 then determines the positions of the panel areas 55, in each of which the vertex figures 210 contained in the first pattern image 200 are drawn (step S6). The controller 60 determines the position shifted inward by the radius r from each of the upper, lower, right, and left ends of each of the panel areas 55 as the position of the panel area 55, where the centers of the vertex figures 210 are drawn.

When the controller 60 determines the positions of the panel areas 55, in each of which the vertex figures 210 are drawn, the controller 60 generates the first pattern image 200 in such a way that the vertex figures 210 are drawn at the determined position of each of the panel areas 55 (step S7). The controller 60 causes the projection unit 50 to display the generated first pattern image 200 on the projection surface 7 (step S8).

The controller 60 then evaluates, based on an operation signal inputted from the remote control light receiver 10, whether or not the operation of changing the position of any of the vertex figures 210 in the first pattern image 200 has been accepted (step S9). When the operation of changing the position of any of the vertex figures 210 has not been accepted (NO in step S9), the controller 60 evaluates whether or not an operation finalizing operation has been accepted based on an operation signal inputted from the remote control light receiver 10 (step S12). When the finalizing operation has been accepted (YES in step S12), the controller 60 transitions to the process in step S13. When the finalizing operation has not been accepted (NO in step S12), the controller 60 returns to the evaluation in step S9.

When the result of the evaluation in step S9 shows that the operation of changing the position of any of the vertex figures 210 in the first pattern image 200 has been accepted (YES in step S9), the controller 60 moves the position of the vertex FIG. 210 selected by the accepted operation by a selected amount of movement. The position of the vertex FIG. 210 is thus changed (step S10). The controller 60 then causes the projection unit 50 to display the first pattern image 200 in which the position of the vertex image 210 has been changed on the projection surface 7 (step S11). The controller 60 then evaluates, based on an operation signal inputted from the remote control light receiver 10, whether or not the operation finalizing operation has been accepted (step S12).

When the finalizing operation has not been accepted (NO in step S12), the controller 60 returns to the evaluation in step S9. When the finalizing operation has been accepted (YES in step S12), the controller 60 generates the first correction data that causes the coordinates, in the panel area 55, of each of the vertex figures 210 before the deformation to move to the coordinates, in the panel area 55, of each of the vertex figures 210 after the deformation (step S13). The controller 60 causes the storage 70 to store the generated first correction data (step S13).

The controller 60 then deforms the shape of the second pattern image 300 based on the generated first correction data (step S14). In detail, the controller 60 deforms the shape of the second pattern image 300 in such a way that the centers of gravity or the centers of the black dots 335 located at the vertices of the second pattern image 300 coincide with the vertex figures 210 in the first pattern image 200 after the deformation.

The controller 60 then causes the projection unit 50 to display the deformed second pattern image 300 on the projection surface 7 (step S15). The controller 60 then causes the imager 30 to perform capturing an image of the projection surface 7 (step S16). The imager 30 performs the image capturing in accordance with the instruction from the controller 60 and outputs the captured image generated by the image capturing to the controller 60. The controller 60 causes the storage 70 to temporarily store the inputted captured image. The controller 60 reads and acquires the captured image from the storage 70 (step S16).

The controller 60 then performs image analysis on the acquired captured image to detect the detection dots 330 (step S17). The controller 60 calculates a determinant for projective transformation based on the detected detection dots 330 (step S18). The controller 60 calculates a determinant that transforms the positions of the first dot 331, the second dot 332, the third dot 333, and the fourth dot 334 in the second pattern image 300 into the positions of the first dot 331, the second dot 332, the third dot 333, and the fourth dot 334 in the captured image.

The controller 60 then performs projective transformation of the positions of the dots contained in the second pattern image 300 after the deformation by using the calculated determinant for projective transformation to identify the positions of the captured dots in the captured image based on the positions of the dots having undergone the projective transformation (step S19). The controller 60 then evaluates whether or not the dots in the second pattern image 300 have been associated with the dots in the captured image (step S20). When the dots in the second pattern image 300 have not been associated with the dots in the captured image (NO in step S20), the controller 60 returns to the process in step S19.

When the dots in the second pattern image 300 have been associated with the dots in the captured image (YES in step S20), the controller 60 generates the second correction data based on the positions of the dots in the captured image (step S21). That is, the controller 60 generates the second correction data, which causes correction of the positions of the associated dots in the second pattern image 300, based on the displacement of the positions of the dots in the captured image.

The controller 60 then performs the quick corner correction and the point correction (step S22). The controller 60 outputs the generated first and second correction data to the image processing section 41. The image processing section 41 corrects the display image data inputted from the communication I/F 20 based on the first and second correction data inputted from the controller 60, and outputs the corrected display image data to the projection unit 50. The projection unit 50 develops in the panel area 55 of each of the liquid crystal panels 53 a display image based on the display image data and corrected by using the first and second correction data. The light outputted from the light source 51 passes through the panel areas 55 to generate image light corresponding to the display image data. The generated image light is enlarged and projected onto the projection surface 7 by the optical unit 59.

3. Effects of Projection Method

As described above, the projection method according to the present embodiment is a projection method executed by the controller 60 of the projector 1.

The controller 60 projects the first pattern image 200 onto the projection surface 7 and accepts the operation of changing the position of a vertex of the first pattern image 200 projected on the projection surface 7.

The controller 60 further deforms the shape of the second pattern image 300 containing a plurality of dots based on the operation and projects the deformed second pattern image 300 onto the projection surface 7.

The controller 60 further acquires a captured image as a result of capture of an image of the projection surface 7 onto which the second pattern image 300 has been projected and generates, based on the captured image, the second correction data for correction of the second pattern image 300 in such a way that the positions of the plurality of dots are corrected.

The controller 60 further causes an image corrected by using the second correction data to be projected onto the projection surface 7.

Distortion of the second pattern image 300 displayed on the projection surface 7, which is the distortion caused by the fact that the projector 1 does not squarely face the projection surface 7, can therefore be corrected.

A captured image as a result of capture of an image of the second pattern image 300 containing the plurality of dots is acquired, and the second correction data for correction of the positions of the plurality of dots contained in the second pattern image 300 are generated based on the acquired captured image.

Therefore, even when the projection surface 7 has a complex shape, the distortion of the image displayed on the projection surface 7 can be accurately corrected.

The controller 60 further changes the position of the vertex of the first pattern image 200 displayed on the projection surface 7 based on the operation.

Deforming the shape of the second pattern image 300 based on the operation includes changing the shape of the second pattern image 300 in such a way that each of the dots disposed at each of the vertices of the second pattern image 300 out of the plurality of dots is located at each of the vertices of the first pattern image 200 after the change.

The operation performed on the first pattern image 200 displayed on the projection surface 7 therefore allows correction of the shape of the second pattern image 300 displayed on the projection surface 7.

The controller 60 accepts the setting of the number of plurality of dots contained in the second pattern image 300 and acquires information on the resolution of the light modulator 52 provided in the projector that projects the second pattern image 300 onto the projection surface 7. The controller 60 further determines the size of the dots based on the number of dots and the information on the resolution of the light modulator 52.

The size of the dots contained in the second pattern image 300 can therefore be determined based on the set number of dots and the resolution of the light modulator 52.

Projecting the first pattern image 200 onto the projection surface 7 includes drawing the first pattern image 200 in the panel areas 55 of the light modulator 52 provided in the projector 1. The controller 60 further causes the light incident on the light modulator 52 to be modulated by the panel areas 55 to generate image light corresponding to the first pattern image 200, and causes the image light to be projected onto the projection surface 7.

The controller 60 calculates the number of pixels, in each of the panel areas 55, that corresponds to the radius of the dots based on the resolution of the second pattern image 300 and the number of dots that form the plurality of dots contained in the second pattern image 300. The controller 60 draws the first pattern image 200 around the pixel shifted inward by the calculated number of pixels from the pixels located at the outer side of the pixels contained in each of the panel areas 55.

The configuration described above can prevent part of the dots contained in the second pattern image 300 from not being displayed on the projection surface 7, and can therefore prevent a decrease in the accuracy of the correction of distortion of the image displayed on the projection surface 7.

The first pattern image 200 contains the vertex figures 210 indicating the range of the area of the projection surface 7, where a plurality of dots can be displayed.

The vertex figures 210 can therefore show the range of the area of the projection surface 7, where a plurality of dots can be displayed, allowing the user to recognize the range of the area of the projection surface 7, where the dots can be displayed.

The first pattern image 200 contains the outer frame 205, which is an image of a frame indicating the range of the area of the projection surface 7, where a plurality of dots can be displayed.

The outer frame 205 can therefore show the range of the area of the projection surface 7, where the dots can be displayed, allowing the user to recognize the range of the area of the projection surface 7, where the dots can be displayed.

4. Effects of Projector

As described above, the projector 1 according to the present embodiment includes the projection unit 50, which projects an image onto the projection surface 7, the remote control 5, which functions as an acceptance unit that accepts operation, and the controller 60.

When accepting the operation of changing the position of a vertex of the first pattern image 200 projected on the projection surface 7 from the remote control 5, the controller 60 deforms the shape of the second pattern image 300 containing a plurality of dots based on the operation.

The controller 60 causes the projection unit to project the second pattern image 300 onto the projection surface 7, and acquires a captured image as a result of capture of an image of the projection surface 7 on which the second pattern image 300 has been projected.

The controller 60 further generates, based on the captured image, the second correction data for correction of the second pattern image 300 in such a way that the positions of the plurality of dots are corrected, and causes the projection unit to project an image corrected by using the second correction data onto the projection surface 7.

Distortion of the second pattern image 300 displayed on the projection surface 7, which is the distortion caused by the fact that the projector 1 does not squarely face the projection surface 7, can therefore be corrected.

A captured image as a result of capture of an image of the second pattern image 300 containing the plurality of dots is acquired, and the second correction data for correction of the positions of the plurality of dots contained in the second pattern image 300 are generated based on the acquired captured image.

Therefore, even when the projection surface 7 has a complex shape, the distortion of the image displayed on the projection surface 7 can be accurately corrected.

The embodiment and the variations thereof described above are each a preferable form in which the present disclosure is implemented. The present disclosure is, however, not limited to the embodiment and the variations thereof described above, and a variety of variations is conceivable to the extent that the variations do not depart from the substance of the present disclosure.

For example, in the embodiment described above, the detection dots 330 and the black dots 335 contained in the dot pattern 310 are each presented as a figure contained in the second pattern image 300. The shape of the figure is not limited to a dot and may, for example, be a square, an oblong, a diamond, or any other rectangle. The configuration in which the second pattern image 300 contains the detection dots 330 and the black dots 335 is presented by way of example, but not necessarily. For example, the second pattern image 300 may instead be a pattern image formed only of the black dots 335 without the detection dots 330. In this case, the black dots 335 contained in the second pattern image 300 may be associated with the black dots 335 contained in the captured image by determining the row and column where each of the black dots 335 is located in each of the image coordinate systems, and associating the black dots 335 located in the same rows and columns in the images with each other.

The process units in the flowchart shown in FIG. 15 are process units divided in accordance with the contents of primary processes for easy understanding of the processes carried out by the projector 1. How to divide the entire process into the process units or the names of the process units shown in the flowchart in FIG. 15 do not limit the present disclosure. The entire process carried out by the projector 1 can be divided into a larger number of process units, or can be so divided that one process unit includes a larger number of processes in accordance with the content of the process. Furthermore, the order in which the processes are carried out in the flowchart described above is not limited to that shown in FIG. 15.

The functional portions of the projectors 1 shown in FIG. 1 each represent a functional configuration achieved by cooperation between hardware and software and are each not necessarily implemented in a specific form. Therefore, hardware corresponding to each of the functional portions is not necessarily implemented, and a single processor that executes a program can, of course, achieve the functions of the plurality of functional portions. Furthermore, part of the functions achieved by software in the embodiment described above may be achieved by hardware, or part of the functions achieved by hardware in the embodiment described above may be achieved by software.

To achieve the projection method according to the present disclosure by using a computer incorporated in the projector 1, a program executed by the computer can be configured in the form of a recording medium. The program executed by the computer can instead be configured in the form of a transmission medium via which the program is transmitted. The recording medium can be a magnetic or optical recording medium or a semiconductor memory device. Specific examples of the recording medium may include a flexible disk, an HDD (hard disk drive), a CD-ROM (compact disc read only memory), a DVD (digital versatile disc), a Blu-ray disc, a magneto-optical disk, a flash memory, and a portable or immobile recording medium such as a card-shaped recording medium. The recording medium described above may instead be a RAM, a ROM, an HDD, or any other nonvolatile storage device that is an internal storage device provided in a server apparatus. Blu-ray is a registered trademark.

The aforementioned embodiment has been described with reference to the configuration in which the imager 30 is incorporated in the projector 1, but not necessarily. The imager 30 may instead be a camera separate from the projector 1 or a terminal that incorporates the imager 30. The terminal that incorporates the imager 30 can, for example, be a personal computer, a smartphone, or a tablet terminal. In this case, the processes in steps S16 to S21 may be carried out by the terminal that incorporates the camera or the imager 30, and the generated second correction data may be transmitted to the projector.

What is claimed is:

1. A projection method comprising:
projecting a first image onto a projection surface;
accepting operation of changing a position of a vertex of the first image;
deforming a shape of a second image containing a plurality of first figures based on the operation, the second image being a different image from the first image;
projecting the second image onto the projection surface;
acquiring a captured image as a result of capture of an image of the projection surface on which the second image is projected;
generating correction data for correction of the second image based on the captured image in such a way that positions of the plurality of first figures are corrected; and
projecting an image corrected by using the correction data onto the projection surface.

2. The projection method according to claim 1,
further comprising changing the position of the vertex of the first image displayed on the projection surface based on the operation,
wherein deforming the shape of the second image based on the operation includes
changing the shape of the second image in such a way that each of first figures disposed at each of vertices of the second image out of the plurality of first figures is located at each of the vertices of the first image after the change.

3. The projection method according to claim 1, further comprising:
accepting a setting of the number of first figures that form the plurality of first figures contained in the second image;
acquiring information on resolution of a light modulator provided in a projector that projects the second image onto the projection surface; and
determining a size of the first figures based on the number of first figures and the information on the resolution of the light modulator.

4. The projection method according to claim 1,
wherein projecting the first image onto the projection surface includes
drawing the first image in a drawing area of a light modulator provided in a projector,
causing light incident on the light modulator to be modulated by the drawing area to generate image light corresponding to the first image, and
projecting the image light onto the projection surface,
the number of pixels in the drawing area, the number corresponding to a radius of the first figures, is calculated based on resolution of the second image and the number of first figures that form the plurality of first figures contained in the second image, and
the first image is drawn around a pixel shifted inward by the calculated number of pixels from pixels located at an outer side of the pixels contained in the drawing area.

5. The projection method according to claim 1, wherein the first image contains a second figure indicating a range of an area of the projection surface where the plurality of first figures are displayable.

6. The projection method according to claim 1, wherein the first image contains an image of a frame indicating a range of an area of the projection surface where the plurality of first figures are displayable.

7. A projector comprising:
a projection lens that projects an image onto a projection surface;
a remote control that accepts operation; and
a processor that
when accepting operation of changing a position of a vertex of a first image projected on the projection surface from the remote control, deforms a shape of a second image containing a plurality of first figures based on the operation, the second image being a different image from the first image,
causes the second image to be projected via the projection lens onto the projection surface,
acquires a captured image as a result of capture of an image of the projection surface on which the second image is projected, generates correction data for correction of the second image based on the captured image in such a way that positions of the plurality of first figures are corrected, and causes an image corrected by using the correction data to be projected via the projection lens onto the projection surface.

\* \* \* \* \*